United States Patent [19]
Roux et al.

[11] Patent Number: 4,752,952
[45] Date of Patent: Jun. 21, 1988

[54] SUBSCRIBER CIRCUIT LINK INTERFACE FOR AN AUTOMATIC TELEPHONE EXCHANGE

[75] Inventors: Raphaël Roux, Argenteuil; José Paulet, Courbevoie; Bernard Gilles, Jouy le Moutier, all of France

[73] Assignee: Thomson-Csf Telephone, Colombes Cedex, France

[21] Appl. No.: 735,516

[22] Filed: May 20, 1985

[30] Foreign Application Priority Data

May 18, 1984 [FR] France ................ 84 07758

[51] Int. Cl.⁴ .......................................... H04M 19/00
[52] U.S. Cl. ..................................... 379/413; 379/405
[58] Field of Search ............... 179/170 NC, 77, 70, 179/16 F, 18 FA, 16 AA, 170 R; 379/398, 399, 405, 413, 345

[56] References Cited

U.S. PATENT DOCUMENTS

| | | | |
|---|---|---|---|
| 4,039,766 | 8/1977 | Picandet | 379/405 |
| 4,292,479 | 9/1981 | Chataignon et al. | 379/405 |
| 4,310,733 | 1/1982 | Schoofs | 379/399 |
| 4,476,350 | 10/1984 | Aull et al. | 379/382 |
| 4,514,595 | 4/1985 | Rosenbaum | 379/385 |
| 4,567,331 | 1/1986 | Martin | 379/345 |

FOREIGN PATENT DOCUMENTS 0073589 5/1982 Japan .

OTHER PUBLICATIONS

Analysis and Design of Analog Integrated Circuits, P. R. Gray et al., John Wiley & Sons, New York, 1977, pp. 150-155.
"One Chip Closes in on SLIC Functions, L. Brown et al., Electronic Design, Sep. 27, 1980, pp. 85-91.

*Primary Examiner*—Jin F. Ng
*Assistant Examiner*—Randall S. Vaas
*Attorney, Agent, or Firm*—Sughrue, Mion, Zinn, Macpeak & Seas

[57] ABSTRACT

The interface of the invention comprises a power supply circuit (16) which is a symmetrical amplifier circuit, and a hybrid circuit (29) controlling the power supply circuit in DC and in AC. The hybrid includes a phase shifter circuit (44, 45) simulating long lines.

Application: private telephony.

8 Claims, 1 Drawing Sheet

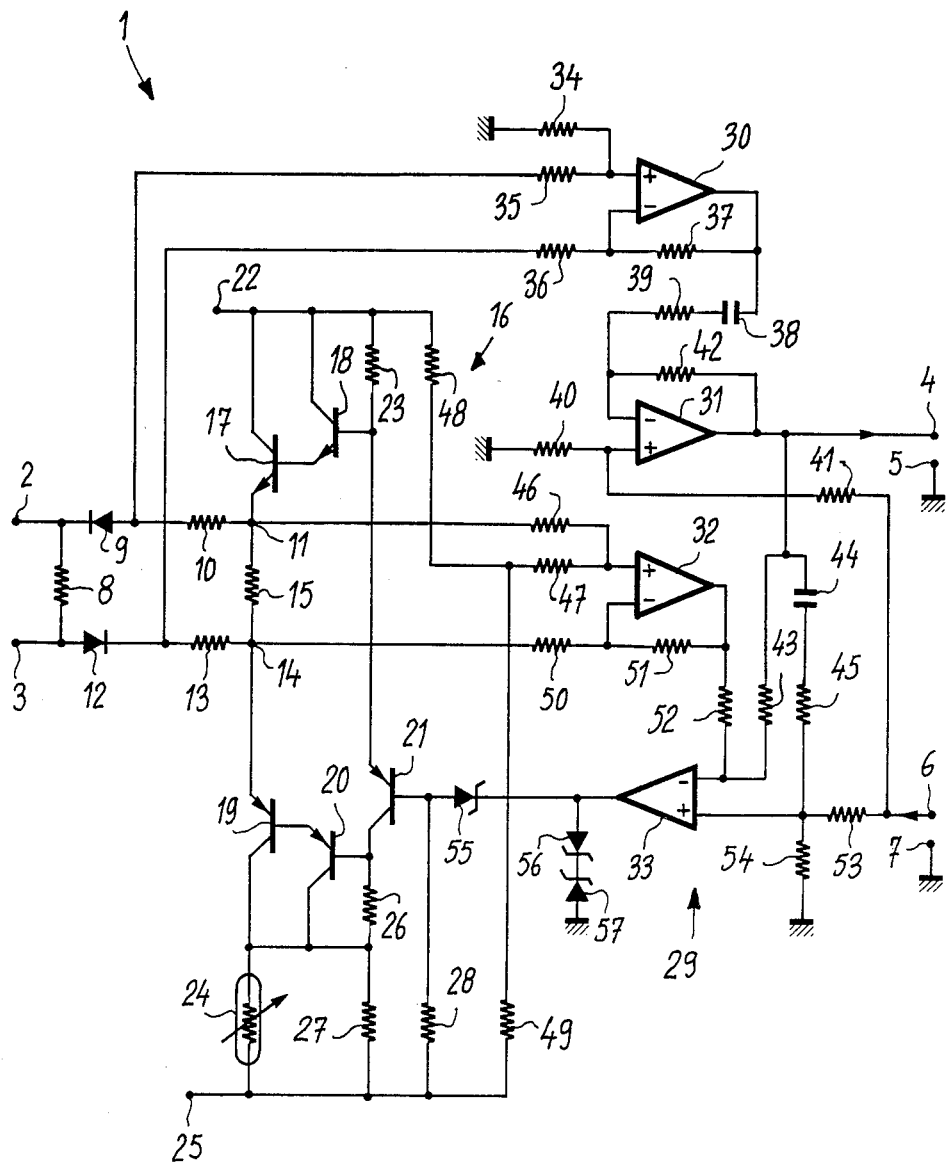

SUBSCRIBER CIRCUIT LINK INTERFACE FOR AN AUTOMATIC TELEPHONE EXCHANGE

The present invention relates to a subscriber circuit link interface for an automatic telephone exchange.

A subscriber circuit link interface comprises, in particular, a power supply circuit, a 2-wire/4-wire hybrid, and a loop circuit. Interfaces made hitherto have, on the subscriber set side, an impedance which can be reduced to a pure resistance of 6b 600 ohms. The response curve of such interfaces remains within limits defined by a template required by Telecommunications Administrations, but tests performed on an acoustic bench are not satisfactory for any known type of interface.

The object of the present invention is to provide an interface of the above-mentioned type which, in addition to a satisfactory response curve, presents good characteristics as measured on an acoustic bench, which characteristics are readily adaptable when the acoustic bench is modified.

An interface in accordance with the invention comprises a power supply circuit have symmetrical outputs establishing a constant floating voltage potential between the line wires, said power supply circuit control input being connected to the output, on the two-wire side, of a 2-wire/4-wire hybrid circuit comprising a plurality of operational amplifiers and connected, in a manner known per se, to the subscriber line wires and to the four-wire terminals of the interface, said hybrid circuit receiving a voltage proportional to the power supply voltage of the power supply circuit and comprising a corrector circuit which takes a portion of the output voltage on the four-wire side and reinjects it without phase shift into one of the inputs to the operational amplifier which is connected to the said control input of the power supply, and injects it with a phase shift into the other input of the same amplifier.

The present invention will be better understood from reading the following detailed description of one embodiment given as a non-limiting example and illustrated in the accompanying drawing whose sole FIGURE is a detailed circuit diagram of said embodiment.

The interface 1 shown in FIG. 1 comprises two symmetrical terminals 2, 3 (on the two-wire side) connected to the A and B wires of the subscriber line (not shown) and two output terminals 4, 5 and two input terminals 6, 7 on the four-wire side, with the terminals 5 and 7 being grounded. The four-wire side is connected to an automatic telephone exchange (not shown).

The terminals 2 and 3 are interconnected via a high value resistance 8, e.g. 220 kilohms. The terminal 2 is connected to the cathode of a diode 9 whose anode is connected via a resistor 10 to a terminal 11. The terminal 3 is connected to the anode of a diode 12 whose cathode is connected via a resistor 13 to a terminal 14. The resistors 10 and 13 are advantageously each equal to one-half of the value of the line resistance (or to the resistive portion of the line impedance). If this line resistance has the conventional value of 600 ohms, the resistors 10 and 13 are each 300 ohms. The terminals 11 and 14 are connected to each other by a high value resistor 15, e.g. having a resistance of 100 kilohms.

The terminals 11 and 14 are connected to floating outputs from a power supply circuit 16 which is now described. The circuit 16 essentially comprises two complementary Darlington circuits respectively comprising NPN transistors 17 and 18 and PNP transistors 19 and 20, together with a PNP phase shifting transistor referenced 21. In the said Darlington circuits, the transistors 18 and 20 are input transistors and the transistors 17 and 19 are output transistors. The collectors of the transistors 17 and 18 are connected to a terminal 22 which is itself connected, in the present case, to ground (a potential of 0 volts). The base of the transistor 18 is connected via a resistor 23 to a terminal 22. The emitter of the transistor 17 is connected to the terminal 11. The connectors of the transistors 19 and 20 are both connected via a common protective thermistor 24 to a terminal 25. The terminal 25 receives a potential of about −44 V to −60 V. (relative to ground). In one embodiment, the thermistor has a resistance of about 25 ohms (nominal value) at currents of less than 90 mA. When the current exceeds 90 mA, the value of the thermistor increases rapidly to prevent too great an increase in the current passing through the transistors 17 and 19 which might otherwise be destroyed. The emitter of the transistor 19 is connected to the terminal 14. The base of the transistor 20 is connected to its own collector via a resistor 26. The common point between the resistor 26, the collectors of the transistors 19 and 20, and the thermistor 24 is connected via a resistor 27 to the terminal 25. The resistor 27 is thus connected in parallel with the thermistor 24 and has a value which is at least two orders of magnitude greater than the nominal value of said thermistor, e.g. 12 kilohms.

The emitter of transistor 21 is electrically connected to the base of transistor 18, and its collector is directly connected to the base of the transistor 20. The base of the transistor 21 is connected via a resistor 28 to the terminal 25.

The 2-wire/4-wire hybrid circuit 29 essentially comprises four operational amplifiers respectively referenced 30 to 33.

The non-inverting input of the amplifier 30 is connected firstly to the ground via a resistor 34 and secondly to the anode of the diode 9 via a resistor 35. The inverting input of the amplifier 30 is connected via a resistor 36 to the cathode of the diode 12 and it is also connected to the output of said amplifier via a feedback resistor 37. The output from the amplifier 30 is connected via an isolating capacitor 38 in series with a resistor 39 to the inverting input of the amplifier 31.

The non-inverting input of amplifier 31 is connected firstly to ground via a resistor 40 and secondly to the terminal 6 via a resistor 41. The output from the amplifier 31 is connected firstly to its inverting input via a feedback resistor 42 and secondly it is directly connected to the terminal 4, furthermore it is connected via a resistor 43 to the inverting input of the amplifier 33 and via a capacitor 44 in series with a resistor 45 to the non-inverting input of the amplifier 33.

The non-inverting input of the amplifier 32 is connected firstly to the terminal 11 via a resistor 46 and secondly by a resistor 47 in series with another resistor 48 to the terminal 22. The common point between the resistors 47 and 48 is connected via a resistor 49 to the terminal 25. The inverting input of the amplifier 32 is connected to the terminal 14 via a resistor 50. The output from the amplifier 32 is connected firstly to its inverting input via a feedback resistor 51 and secondly via a resistor 52 to the inverting input of the amplifier 33.

The non-inverting input of the amplifier 33 is connected firstly to the terminal 6 via a resistor 53 and secondly to ground via a resistor 54. The output from the amplifier 33 is connected to the cathode of a zener diode 55 whose anode is connected to the base of a transistor 21. The output from the amplifier 33 is also connected via two zener diodes 56 and 57 connected in series and head-to-tail, both of which may have a zener voltage of about 4.3 V. The zener diode 55 may have a zener voltage of about 3.9 V for a current of about 2 mA.

The power supply circuit 16, comprising essentially the phase shifting input transistor 21 (180° phase shift) and the two complementary Darlington circuits 17, 18 and 19, 20, operate as a symmetrical amplifier both for DC and AC, and it is DC servo-controlled by the amplifiers 32 and 33.

In DC operation, the reference voltage taken from the common point between the resistors 48 and 49 which constitute a divider bridge between the terminals 22 and 25 is applied to the non-inverting input of the amplifier 32 which also receives, via the resistors 46 and 50 a voltage which is proportional to the potential difference between the A and B wires (connected to terminals 2 and 3). The error voltage at the output from amplifier 32 is transmitted via amplifier 33 to transistor 21, thereby regulating the voltage at the terminals of the resistor 15 to floating potentials, and thereby regulating the potential difference between the lines.

In one embodiment, the terminal 22 is at a potential of 0 volts, the terminal 25 is at a potential of −50 V, and the potential at the common point between the resistors 48 and 49 is at −2 V, with the potential difference between the terminals 11 and 14 being regulated to 40 V, such that the potentials of said terminals are respectively at about −5 V and −45 V.

In AC operation, a portion of the line voltage (determined by the ratio between the values of resistors 37 and 36) is conveyed via the amplifiers 30 and 31 to the inverting input of the amplifier 33 which also receives a portion of the line voltage as determined by the ratio between the resistors 51 and 52, which is equal to the ratio between the resistors 37 and 36 via the amplifier 32, said portion being of amplitude equal to the said other portion which it receives from the amplifiers 30 and 31 but in phase position thereto (30 and 31 provide a phase shift of 180° twice over, whereas 32 applies a phase shift of 180° once only). If this equality holds over the entire transmitted frequency band, all of the AC line signal is to be found at the terminals 4 and 5 and none of it is reinjected via the amplifier 33. Furthermore, the output signal from the amplifier 31 is transmitted via the series circuit comprising the capacitor 44 and the resistor 45 to the non-inverting input of the amplifier 33. It has been observed that the slight phase shift applied by this series circuit simulates subscriber line effects to a very good approximation. In one embodiment, the value of 44 is about 3.3 nF, and the value of 45 is about 2.2 kilohms in order to simulate a 4 km line made from 0.4 mm diameter conductor looped on a 600 ohm resistance.

We claim:

1. A subscriber circuit link interface for an automatic telephone exchange comprising: a power supply circuit for establishing a constant floating potential between a pair of subscriber line wires, a two-wire/four-wire hybrid circuit, two-wire terminals of said hybrid circuit being connected to said subscriber line wires and four-wire terminals of said hybrid circuit being connected to said telephone exchange, said four-wire terminals comprising a pair of input terminals and a pair of output terminals, said hybrid circuit comprising a plurality of operational amplifiers connected to respective ones of said two-wire terminals and said input and output terminals, a control input of said power supply circuit being connected to an output of a first of said operational amplifiers, and said hybrid circuit further comprising corrector circuit means for reinjecting a portion of a signal on said output terminals without phase shift to a first input of said first operational amplifier and with a phase shift to a second input of said first operational amplifier, means for deriving a reference voltage from a supply voltage of said power supply circuit, said reference voltage being applied to a non-inverting input of a second of said operational amplifiers via a linear impedance, said non-inverting input and an inverting input of said second operational amplifier being connected to said two-wire terminals, an output of said second operational amplifier being connected to said first input of said first operational amplifier.

2. The subscriber circuit link interface of claim 1, wherein said corrector circuit means comprises a first resistor for coupling said signal on said output terminals to said first input of said first operational amplifier, and a series circuit of a second resistor and a capacitor coupling said signal on said output terminals to said second input of said first operational amplifier.

3. The subscriber circuit link interface of claim 2, wherein values of said first and second resistors and said capacitor are selected to simulate a line of an approximate length of 4 km having a conductor diameter of approximately 0.4 mm.

4. The subscriber circuit link interface of claim 3, wherein said first and second resistors have values of approximately 2.2 kilohms and said capacitor has a value of approximately 3.3 nF.

5. The subscriber circuit link interface of any one of claim 1 to 4, wherein said power supply circuit comprises a phase shifting type input transistor having a 180° phase shift, first and second complementary Darlington circuits, phase shifted outputs of said input transistor being connected to inputs of said Darlington circuits, and a resistor connected in a series circuit with collector-emitter paths of output circuits of said first and second Darlington circuits between power source terminals providing power to said power supply circuit, said input transistor receiving said signal on said output terminals as an input thereto.

6. The subscriber circuit link interface of claim 5, wherein first and second terminals of said resistor connected in said series with said collector-emitter paths of said output circuits are connected respectively to said inverting and non-inverting inputs of said second operational amplifier.

7. A subscriber circuit link interface for an automatic telephone exchange, comprising:
a power supply circuit for establishing a constant floating point potential between a pair of subscriber line wires, said power supply circuit comprising a phase shifting type input transistor responsive to a control input for providing phase shifted outputs which differ in phase from one another by 180°, first and second complementary Darlington circuits, said phase shifted outputs of said input transistor being connected to inputs of said Darlington circuits, and a resistor connected in a series circuit with collector-emitter paths of output circuits of said first and second Darlington circuits between power source terminals providing power to said power supply circuit;

a two-wire/four-wire hybrid circuit, two-wire terminals of said hybrid circuit being connected to said subscriber line wires and four-wire terminals of said hybrid circuit being connected to said telephone exchange, said four-wire terminals comprising a pair of input terminals and a pair of output terminals, said hybrid circuit comprising a plurality of operational amplifiers connected to respective ones of said two-wire terminals and said input and output terminals with an output of a first of said operational amplifiers providing said control input to said input transistor, and said hybrid circuit further comprising corrector circuit means for reinjecting a portion of a signal on said output terminals without phase inversion to a first input of said first operational amplifier and with a phase shift to a second input of said first operational amplifier, means deriving a reference voltage from a supply voltage of said power supply circuit, said reference voltage being applied to a non-inverting input of a second of said operational amplifiers, said non-inverting input and an inverting input of said second operational amplifier being connected to said two-wire terminals and to respective first and second terminals of said resistor, an output of said second operational amplifier being connected to said first input of said first operational amplifier, and a third of said operational amplifiers having respective inverting and non-inverting inputs connected to said two-wire terminals and an output capacitively coupled to an input of a fourth of said operational amplifiers, said fourth operational amplifier having an output connected to said output terminal.

8. The subscriber circuit link interface of claim 7, wherein a gain of said second operational amplifier is equal to a gain of said third operational amplifier.

* * * * *